No. 699,767. Patented May 13, 1902.
F. W. SAXBY.
FOCUSING ATTACHMENT FOR CAMERAS.
(Application filed Oct. 7, 1899.)
(No Model.)
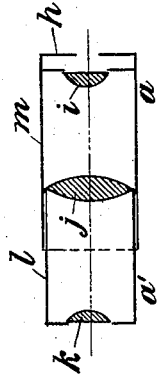
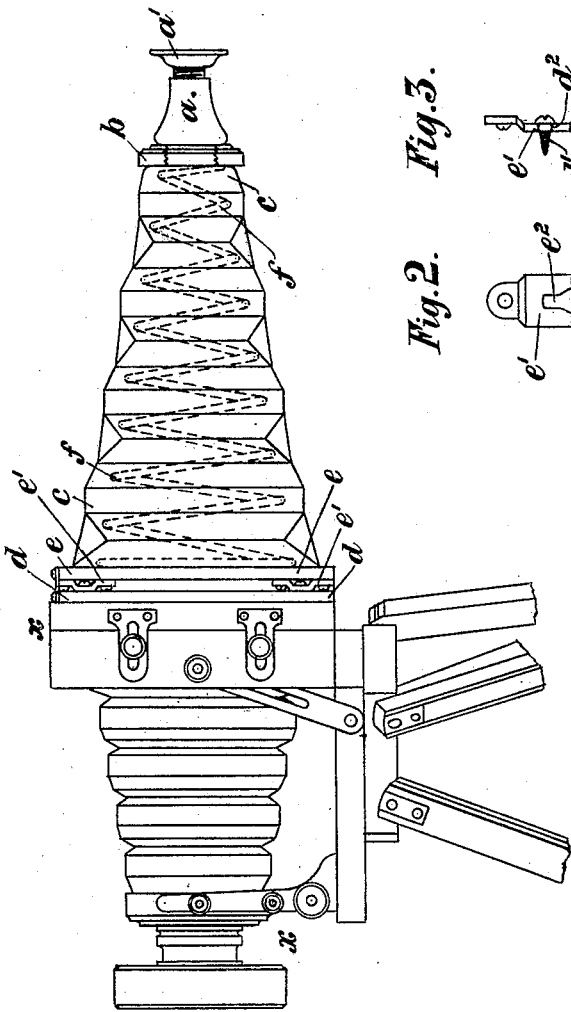
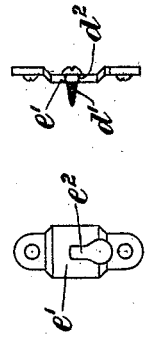
WITNESSES:
INVENTOR
Frederick William Saxby
BY
ATTORNEYS

UNITED STATES PATENT OFFICE.

FREDERICK WILLIAM SAXBY, OF LIVERPOOL, ENGLAND.

FOCUSING ATTACHMENT FOR CAMERAS.

SPECIFICATION forming part of Letters Patent No. 699,767, dated May 13, 1902.

Application filed October 7, 1899. Serial No. 732,919. (No model.)

*To all whom it may concern:*

Be it known that I, FREDERICK WILLIAM SAXBY, a subject of the Queen of England, and a resident of Liverpool, England, have invented certain new and useful Improvements Connected with Focusing Attachments for Cameras, of which the following is a specification.

This invention has for its object to provide means in connection with photographic stand-cameras, by which the arranging or "composing" of the subject on the screen of an ordinary ground glass can be better carried out and with greater accuracy than at present, and consequently more satisfactory photographs obtained.

It consists of the employment on the back of the camera in the manner hereinafter described behind the ordinary ground glass on which the object or image is thrown in preparing for taking a photograph of a short-focus reversing-glass mounted on the back end of a closed case or chamber fitted onto the back of the frame of the ordinary ground-glass screen of the camera.

This is illustrated in Figure 1 of the drawings, which is a side elevation, showing an ordinary stand-camera provided with this improvement. Figs. 2 and 3 are front and side elevations of the detachable fastening for quickly fitting the apparatus on the camera and taking it off.

The short-focus reversing-glass is marked $a$, and by its reversing nature the object thrown onto the ground glass of the camera in viewing the object prior to taking the photograph is seen the right side up and not in reverse, as it appears without the glass. This glass $a$ is detachably fixed in the plate $b$—say by screw-threads on its end—which is fitted onto the outer end of the bellows $c$, the front end of the bellows being fixed onto the frame $d$ of the ordinary ground-glass screen of the camera, which is of the ordinary kind and generally designated $x$. The glass $a$ is kept firm, standing out from the back of the camera in the position shown in the drawings, by means of the spiral spring $f$ inside $c$, fixed to the frame $e$ and board $b$ when expanded, or it may be held out by any equivalent means. This spring $f$ supports the glass sufficiently firmly out in the position shown and at the same time allows of slight lateral movement, being elastic when the eyepiece $a'$ of the glass $a$ is touched by the user's face in being looked through, so that the camera itself is not shaken or disturbed.

The spring $f$ of course allows of the case $c$ being collapsed for close stowage by pressing the parts $b$ and $e$ toward one another and locking them together in any suitable known way.

I have found that the erected image as it would be seen on the ground glass by a reversing-glass of existing construction would be defective and untrue and that a new construction of glass is necessary for the satisfactory and effective accomplishment of the end desired.

Fig. 4 shows my short-focus reversing-glass. It consists of a small stop $h$, having an aperture of about .15, an object-lens $i$, having one surface plane and the other convex of about .5 radius with aperture of about .6 of an inch and disposed about .2 of an inch behind the stop $h$, a double convex lens $j$ of about .95 radius, with an aperture of about .95, and an eye lens or glass $k$, having a plane external surface, and a convex internal surface of about .6 radius and with an aperture of about .6. The distance between the lenses $i$ and $j$ may be about 1.1 inches, and the length of the tube $l$ in which the tube $m$ slides about 1.3 inches.

It is well known that if the subject to be photographed were thrown onto the screen $d$, as seen by the eye naturally, instead of upside down, as is now always done, the subject could be better arranged, and better or more artistic and satisfactory pictures could be produced, and it is well known that this has been a long-felt want of photographers. It is, however, also well known that this end could be easily effected by using lenses in the camera which would make the subject appear the right side up; but there are against this certain well-known technical and scientific objections which render the use of this method of accomplishing the object impossible—that is, more objectionable than the reversed image as now exists. Consequently this method is never employed. By my invention the object is attained by the employment of the case $c$ closely fitting—*i. e.*, light-tight—to the ground-glass screen $d$ and having at its outer end the short-focus reversing-glass $a$, by which the image of the subject thrown onto the screen in reverse by the lenses of the camera is again reversed or "erected" by the reversing-glass and is seen as normally seen by the eye, and, furthermore, the case $c$ being made of collapsible bag form, such as the kind of collapsing material used on the front of cameras and like photographic apparatus, it can be collapsed and occupies little space when off the camera.

To connect this apparatus with and disconnect it from the camera, the front wood frame $e$ is provided with fastening-plates $e$, (see Figs. 2 and 3,) having slots $e^2$ in them which fit over the heads of screws $d'$, having plain shoulders $d^2$ on them, and which screw into the back of the screen-frame $d$, one of said fastenings being used at each corner. By this attachment the whole apparatus consisting of frames $e$, collapsing chamber $c$, back frame $d$, and reversing-glass $a$ can be lifted on and off, collapsed, and stowed away or applied and extended very quickly, and will take little space when closed.

I do not wish to limit myself to the use of a single glass $a$, and instead of the form of case $c$ specified any kind of light-excluding case suitable to the work for which it is required may be employed, and it is to be stated generally that the invention is not restricted to the form or construction of parts particularly as shown or specified.

What is claimed in respect of the herein-described invention is—

1. The combination with a photographic camera of a short-focus reversing-glass, and a carrier, connecting the back of the camera and the glass, and supporting the same substantially as set forth.

2. In combination with a camera, a short-focusing reversing eyepiece and an adjustable carrier between the same and the back of the camera, substantially as described.

In witness whereof I have hereunto set my hand in presence of two witnesses.

FREDERICK WILLIAM SAXBY.

Witnesses:
 JOHN H. WALKER,
 FRANK E. FLEETWOOD.